July 11, 1961     A. S. CHARLAT     2,991,666

POWER-TRANSMITTING DEVICE FOR MACHINE TOOLS

Filed Nov. 20, 1958     3 Sheets-Sheet 1

INVENTOR
Arnold S. Charlat
BY
Pennie Edmonds Morton Barrows Taylor
ATTORNEYS

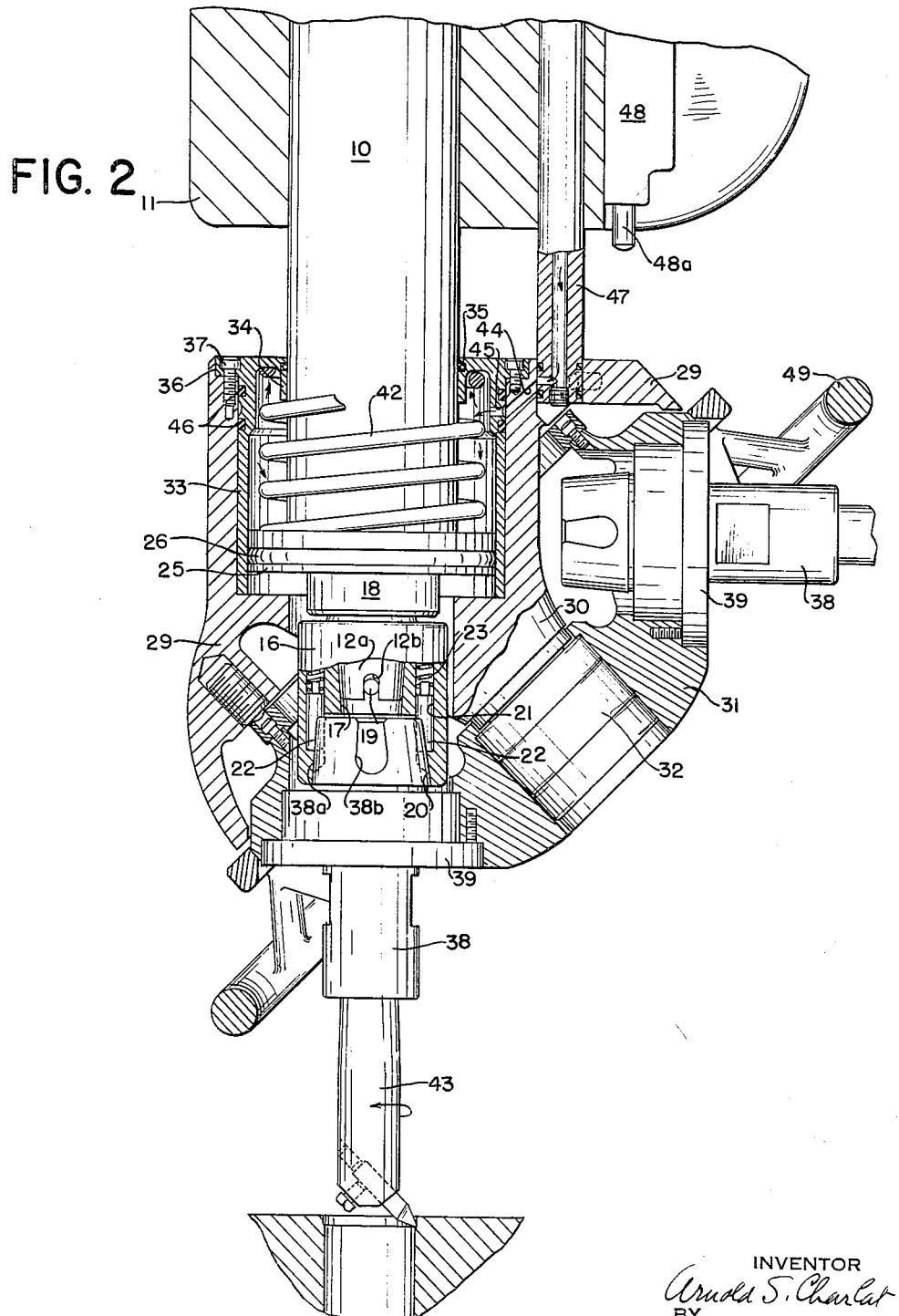

July 11, 1961 A. S. CHARLAT 2,991,666
POWER-TRANSMITTING DEVICE FOR MACHINE TOOLS
Filed Nov. 20, 1958 3 Sheets-Sheet 3
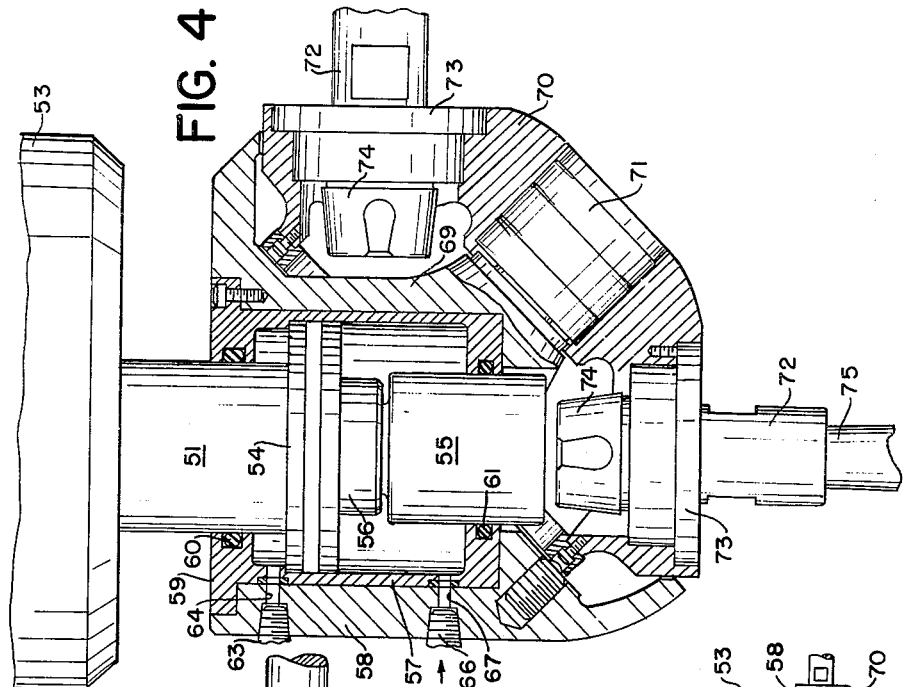
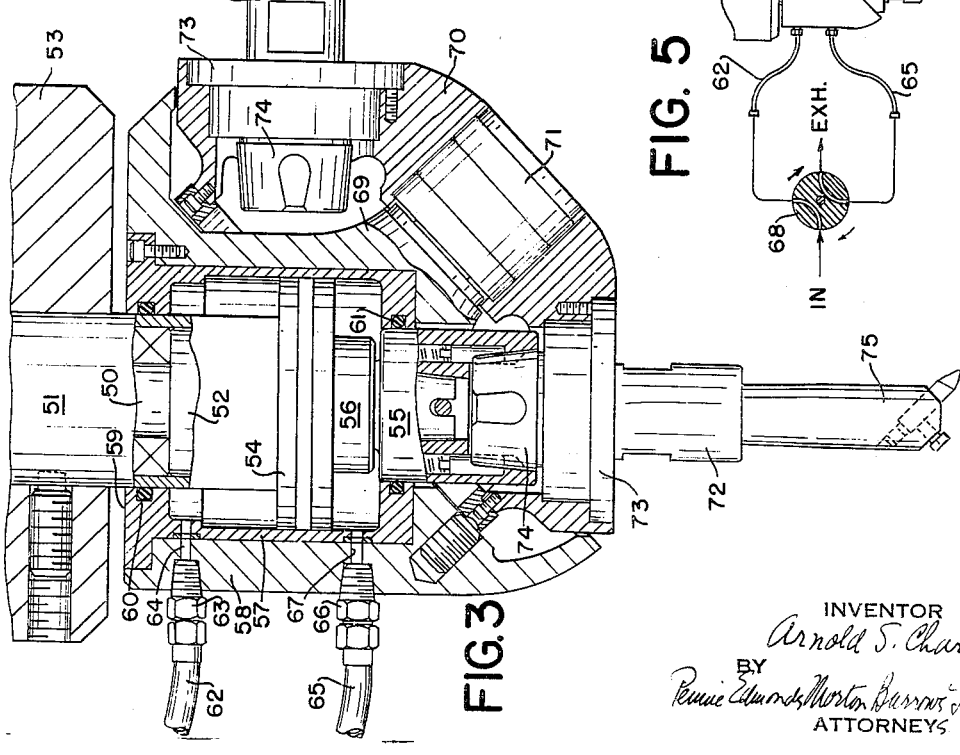
INVENTOR
Arnold S. Charlat
BY
Pennie Edmonds Morton Barrows Taylor
ATTORNEYS

United States Patent Office 2,991,666
Patented July 11, 1961

2,991,666
POWER-TRANSMITTING DEVICE FOR MACHINE TOOLS
Arnold S. Charlat, Norwalk, Conn., assignor, by mesne assignments, to Brown & Sharpe Manufacturing Company, Providence, R.I., a corporation of Rhode Island
Filed Nov. 20, 1958, Ser. No. 775,302
11 Claims. (Cl. 77—25)

This invention relates to machine tools, such as machines employed for drilling, tapping, boring, and like operations, and is concerned more particularly with a novel power-transmitting device for use in such a machine for connecting the tool to the main spindle of the machine to be driven thereby. The device makes possible the quick connection and disconnection of the tool holder from the spindle and, when the device is operative with the connection established, the tool holder is so firmly secured to the spindle that slippage and looseness in the connection are minimized, even though the operation performed with the tool imposes a heavy load on the connection. The new device may be employed to special advantage in a machine equipped with means for handling a plurality of tools and presenting them selectively to the main spindle for connection thereto and a machine so equipped will, accordingly, be illustrated and described in detail for purposes of explanation.

For a better understanding of the invention, reference may be made to the accompanying drawings, in which—

FIG. 2 is a view similar to FIG. 1 but showing the device in operative condition;

FIG. 3 is a view similar to FIG. 1 but showing a modified construction;

FIG. 4 is a view similar to FIG. 3 but showing the device in inoperative condition; and FIG. 5 is a diagrammatic view of the fluid connections to the device shown in FIG. 3.

Figure 1:
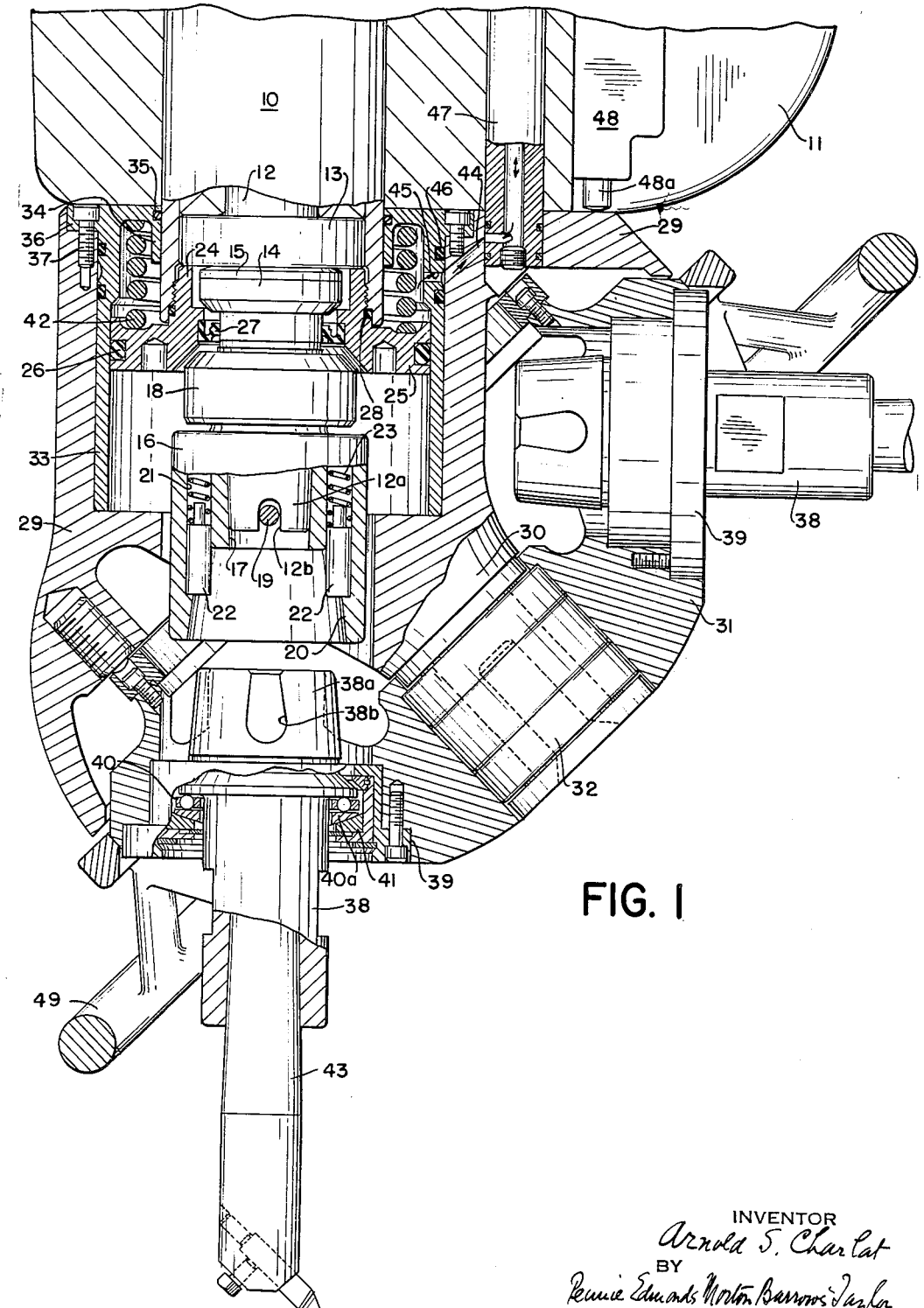
FIG. 1 is a view, partly in vertical section and partly in elevation, of a machine tool which has a turret for handling a plurality of tools and is equipped with the power-transmitting device of the invention.

The machine shown in FIGS. 1 and 2 includes a column rising from a base and supporting a table and a housing extending over the table, these parts being of conventional construction. A quill 10 is mounted in the housing for vertical movement and its lower end projects below the bottom of the lower part 11 of the housing. The main drive spindle 12 of the machine is mounted in the quill for rotation in bearings, of which parts of the lower bearings 13 only are shown, and a nut 14 threaded on the spindle supports a retainer ring 15 on which the inner race of the lowermost of the bearings 13 rests.

The lower end section 12a of the spindle is formed with a taper and has a transverse slot 12b across its lower end. A driving member 16 is mounted on the spindle and it is formed with a bore 17 receiving the tapered end section 12a of the spindle with a tight fit. The driving member is held against the spindle end section by a nut 18 which engages an extension at the top of the member and is threaded on the spindle, and the member carries a transverse pin 19 lying within the slot 12b at the end of the spindle and preventing rotational movement of the member relative to the spindle.

The driving member 16 is preferably of the construction disclosed in my co-pending application Ser. No. 613,932, filed October 4, 1956, which issued as Patent No. 2,866,530, and it is formed with an inwardly tapered recess 20 at its lower end and with a plurality of bores 21 extending parallel to and offset from its axis and intersecting the surface of the recess 20 at their lower ends. A pin 22 disposed in each bore is urged by a spring 23 toward the lower end of its bore, so that a part of each pin is exposed within the recess 20.

A sleeve 24 is threaded into the lower end of the quill and supports the outer race of the lowermost bearing 13. Beyond the end of the quill, a piston 25 is attached to the sleeve, the piston being sealed in the cylinder as by having a peripheral slot, in which a resilient O-ring 26 is disposed. The piston encircles the spindle below the nut 14 and a resilient oil seal ring 27 is disposed between the piston and the spindle. A seal ring 28 is also interposed between the inner surface of the quill and the outer surface of the sleeve 24.

In the machine illustrated, the support for tools is a turret comprising a hollow head 29 having a neck 30, on which a tool holder carrier 31 is mounted for rotation on bearings 32. The head is formed to provide a chamber extending inward from its upper end and a cylinder 33 is mounted within the chamber to enclose the piston 25 with a sliding fit. The cylinder has an opening at its lower end through which the driving member 16 extends, and, at its upper end, the cylinder is formed with an internal flange 34 which surrounds the quill and fits its outer surface snugly, the flange and quill being sealed by a ring 35. The cylinder is also provided with an external flange 36 at its upper end which is seated in a groove in the head and is held in place by screws 37.

The tool holder carrier is formed with a circular series of openings, in each of which a tool holder 38 in the form of a rotary spindle is mounted in a housing 39 containing an anti-friction bearing 40. The lower race 40a of the bearing has a lower surface of spherical contour and rests upon a seat of similar shape on a ring 41. Each tool holder projects into the housing and its inner end 38a serves as a driven member and is formed with a tapered surface corresponding to that in the recess 20 of the driving member 16. The tapered surface of each driven member is also formed with slots 38b, in which the pins 22 of the driving member may be received.

The turret is mounted on the exposed end section of the quill 10 by means including a resilient element 42 in the form of a coil spring, which lies within the cylinder 33 and bears at one end against the upper face of the piston 25 and, at the other, against the inner surface of the flange 34. As the piston is rigidly attached to the quill, the spring tends to urge the turret and quill in opposite directions with the turret urged upwardly, so that the driven member 38b on the tool spindle in effective position and axially aligned with the main spindle 12 will enter the driving member 16 and establish a driving connection between the main spindle and the tool spindle. Initially, this connection depends upon the tight fit of the tapered surfaces of the driving and driven members but, if slippage between the members occurs, the pins 22 on the driving member, which are ordinarily forced upwardly into their bores, will enter the slots 38b of the driven member and stop such slippage. As the weight of the tool support and the tool spindles and tools carried thereby is borne by the spring, the force of the spring tending to maintain the connection between the driving member and the driven member of the tool in effective position may be inadequate for the purpose, particularly when the tool, such as the tool 43, is used for boring operations. In the new power-transmitting device, the action of the spring is, accordingly, supplemented by fluid-operated means, preferably pneumatic.

The pneumatic means include an air passage 44 formed through the wall of the housing and leading to a passage 45 through the wall of the cylinder into the space above the piston 25, the cylinder 33 being sealed in the turret head above and below the passage by rings 46 to avoid leakage. Air is supplied to the passage through a tubular member 47, which is rigidly attached to the head 29 and extends up through a bore in the machine housing 11. The tube 47 prevents the housing 29 from rotational movement relative to the quill 10 and the upper end of the tube within the machine housing 11 is connected by a flexible connection to a supply of air under pressure. The flow of air through the passage to and from the cylinder is controlled by a conventional three-way valve 48 having an operating plunger 48a and the valve is mounted on the machine housing 11 with its plunger in position to be operated by engagement with the top of the turret head 29 when the quill is raised. The valve is normally biased to permit the flow of air from the supply through the tube 48 and the passages 44 and 45 into the cylinder above the piston but, when the plunger 48a is in raised position as shown in FIG. 1, the valve cuts off the flow of air from the supply to the cylinder and permits the air within the cyilnder to escape.

When a tool change is to be made, the quill is raised until the top of the turret head 29 first moves the valve plunger 48a to cause valve 48 to let air escape from the cylinder and then engages the lower part of the machine housing 11. Upon further upward movement of the quill with the upward movement of the turret arrested, the driving member 16 on the main spindle is raised out of contact with the driven member 38a of the tool spindle carrying the tool previously in use and, in such continued upward movement of the quill, the spring 42 is compressed. When the driving and driven members have been completely separated, the tool spindle carrier 31 is rotated by its hand wheel 49 or other means to place in effective position the tool spindle carrying the tool to be used in the next operation and the quill is then lowered. During the initial part of such downward movement, the spring 42 expands to hold the turret head against the machine housing 11 and the effect is to move the turret upwardly along the quill. This relative movement of the quill and the turret causes the driven member 38a of the tool spindle in effective position to engage the driving member 16 and, when the quill has been moved downward a sufficient distance, the top of the turret head 29 moves out of contact with the housing 11 and the plunger 48a of the air valve 48. The valve then operates to permit air from the supply to flow into the cylinder above the piston. The force of the air acting on the piston 25 and the flange 34 then supplements the force of the spring in urging the turret and quill in opposite directions and holding the driven member of the effective tool spindle more tightly in contact with the driving member. When the operation with the selected tool has been completed and a new tool is to be used, the quill is again raised and the sequence of operations above described is repeated.

In the new power-transmitting device in the form above described, the connection between the main spindle and the tool holder through the mating tapered surfaces on the driving and driven members may be established wholly by the action of the spring or, by placing the valve 48 so that its plunger is released before the surfaces have completely mated, the action of the spring may be supplemented by the fluid under pressure. As the surfaces move together, their mating is facilitated by the self-centering action of the tool holder resulting from its being supported by a bearing on a spherical seat. During the use of the tool, the connection between the members is maintained by the combined forces of the spring and the fluid. When the driving and driven members are to be separated, as in changing tools, the quill is raised by the operator and the fluid is first released, after which the spring is compressed. Since the tools may be frequently changed, the spring must not be so strong as to cause undue fatigue of the operator in compressing it.

In some operations, such as drilling, the forces applied to the tool are substantially axial and assist in maintaining the connection between the driving and driven members. A spring of insufficient strength to fatigue the operator would of itself be capable of maintaining the connection between the driving and driven members during many such operations but, in boring operations, the forces applied to the tool are largely lateral and have a torque component. Such forces may be of such magnitude that, if the connection were maintained only by the spring, the forces would unseat the tapered surfaces with resultant damage to the parts and destruction to the accuracy of the operation. In the new device, the total force applied by the spring and the fluid-operated means for holding the driving and driven members together may be many times as great as that of the spring alone and the likelihood of unseating the tapered surfaces is minimized. At the same time, the desired result is obtained without the use of a spring of such strength as to cause operator fatigue in tool changing.

In the modified form of the new power-transmitting device illustrated in FIGS. 3–5, incl., the main spindle 50 is mounted for rotation in a quill 51 in bearings, of which a part of the lowermost bearings 52 only is shown. The quill is mounted against movement in a housing 53 of the machine and, near its lower end, carries a piston 54 similar to the piston 18 and similarly mounted on the quill. Below the piston, a driving member 55 is attached to the end of the spindle 50 by a nut 56. The driving member 55 is similar in construction to the driving member 16 and it has a similar internal tapered surface. The piston 54 lies within a cylinder 57 mounted in the hollow head 58 of a turret. At its upper end, the cylinder has an internal flange 59 encircling the quill and sealed thereto by a seal ring 60 and, at its lower end, the cylinder has an internal flange fitting the driving member 55 with a sliding fit and sealed thereto by a seal ring 61. A fluid line 62 is connected to a fitting 63 threaded into the end of a passage 64, which extends through the wall of the head 58 and the wall of the cylinder into the space within the cylinder above the piston. A second fluid line 65 is connected to a fitting 66 threaded into the end of a passage 67 which extends through the walls of the head and cylinder into the space within the cylinder below the piston. The lines 62, 65 are connected to a source of fluid under pressure through a conventional valve 68, by which either line may be connected to the supply with the other line connected to an exhaust receptacle.

The head 58 is provided with a neck 69, on which a tool holder carrier 70 is mounted to rotate on bearings 71, and the carrier is formed with a circular series of openings, in each of which a tool holder 72 in the form of a rotary spindle is mounted in a housing 73 similar to the housing 39 and containing an anti-friction bearing supporting the tool holder and resting on a spherical seat. The inner end of each tool spindle serves as a driven member 74 and is formed with an external tapered surface adapated to mate with the internal tapered surface of the driving member 55.

In the use of the device in its modified form, the connection between the driving and driven members on the main spindle and on the tool spindle axially aligned therewith is established and maintained by fluid under pressure introduced above the piston and tending to move the turret upwardly along the quill. During the performance of an operation, such as a boring operation performed by the tool 75 in effective position, the workpiece is advanced toward the tool as the operation progresses and is retracted, when the operation is completed, or the workpiece may remain stationary and the housing 53 may be moved toward and away from the workpiece. When a change in tools is to be made, the valve 68 is turned 90° in either direction, and this connects the supply of fluid under pressure to the cylinder below the piston 54 and, at the same time, connects the space within the cylinder above the piston to the exhaust receptacle. The incoming fluid moves the turret to the position shown in FIG. 4, in which the driving and driven members are separated and the tool holder carrier can be rotated to bring the tool for the next operation into alignment with the main spindle. The valve is then turned through 90° to admit fluid into the cylinder above the piston and exhaust the fluid from the cylinder beneath the piston and the fluid so admitted caused the turret to rise with the tapered surfaces on the driving and driven members mating.

For many purposes the fluid employed in the device is air under pressure but, in some applications of the device, a liquid is used instead of the air. In the first form of the device, a coil spring may most conveniently be employed as the resilient element but, if preferred, the cylinder and piston may be of the double acting type shown in FIGS. 3 and 4, in which event the resilient element may take the form of quantity of fluid trapped above the piston under pressure. When a fluid is thus used as the resilient element, it may be necessary to connect the space in the cylinder above the piston to an expansion chamber in order that the fluid above the piston may be compressed, as is necessary when the driving and driven members are to be separated, without undue effort on the part of the operator.

I claim:

1. A machine for drilling and like operations which comprises a quill, a drive spindle mounted for rotation in the quill, a driving member on the spindle, a tool holder support mounted on the quill for relative movement lengthwise thereof, a tool holder mounted for rotation on the support in axial alignment with the spindle, a driven member on the tool holder, the driving and driven members having tapered surfaces adapted to mate to connect the spindle and holder for rotation in unison, and means for effecting relative movements of the support and the spindle to mate and separate the tapered surfaces on the members and for holding the members with their surfaces mated, said means including fluid-operated means for holding the members with the surfaces mated and said fluid-operated means comprising a cylinder and a piston, one of which is secured to the quill and the other to the tool holder support.

2. The machine of claim 1, in which the fluid-operated means is operable to effect relative movements of the support and quill as well as to hold the members with their surfaces mated.

3. The machine of claim 1, in which the cylinder is mounted on the support and the piston is within the cylinder and attached to the quill.

4. The machine of claim 3, which includes means for admitting fluid into the cylinder on both sides of the piston in alternation.

5. The machine of claim 3, which includes a resilient element urging the support and the quill to move relatively to cause the members to approach each other and means for admitting fluid into the cylinder at one side of the piston only, the fluid acting to assist the resilient element in holding the members with their tapered surfaces mated.

6. The machine of claim 3, in which a resilient element acts on one side of the piston and on a part attached to the support, the element urging the piston and support to move to cause the members to mate, and means are provided for admitting fluid into the cylinder at the side of the piston acted on by the resilient element.

7. The machine of claim 3, which includes a valve controlling flow of the fluid into the cylinder, the valve being biased to allow fluid to flow from a supply line into the cylinder and being operable by the support moving in one direction with the quill to shut off flow from the supply and to allow the escape of the fluid from the cylinder.

8. The machine of claim 1, in which the means for effecting relative movements of the support and the quill and for holding the members with their surfaces mated include a resilient element engaging the quill and the support and tending to move the support and the quill relatively to cause the surfaces to approach each other.

9. The machine of claim 1, in which the tool holder support includes a head mounted on the quill for movement lengthwise thereof and a tool holder carrier mounted movably on the head, the carrier having means for carrying a plurality of tool holders and being movable to place the holders selectively in axial alignment with the spindle, and resilient means to urge the support and the quill in opposite directions to cause the driving and driven members to mate.

10. The machine of claim 9, in which the carrier is mounted for rotation on the head and a tubular guide movable in a fixed bore and rigidly attached to the head prevents rotation thereof relative to the quill and acts as a fluid passage forming part of the fluid-operated means.

11. The machine of claim 1, in which the tool holder rests on a self-centering mounting in the support.

References Cited in the file of this patent

UNITED STATES PATENTS 2,859,644    Watts _____ Nov. 11, 1958

FOREIGN PATENTS 764,671    Great Britain _____ Dec. 28, 1956